US008406571B2

(12) United States Patent
Weinberger et al.

(10) Patent No.: US 8,406,571 B2
(45) Date of Patent: Mar. 26, 2013

(54) AUTOMATIC SUPER-RESOLUTION TRANSFORMATION FOR IMAGES

(75) Inventors: Killian Quirin Weinberger, Mountain View, CA (US); Malcolm G. Slaney, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 564 days.

(21) Appl. No.: 12/700,306

(22) Filed: Feb. 4, 2010

(65) Prior Publication Data
US 2011/0188770 A1 Aug. 4, 2011

(51) Int. Cl.
*G06K 9/32* (2006.01)
(52) U.S. Cl. ........ 382/299; 382/274; 382/275; 382/305; 709/217; 709/220; 709/223
(58) Field of Classification Search ............ 382/274, 382/275, 299, 305; 709/217, 220, 223
See application file for complete search history.

(56) References Cited

U.S. PATENT DOCUMENTS

| | | | | |
|---|---|---|---|---|
| 5,542,003 | A * | 7/1996 | Wofford | 382/132 |
| 5,559,754 | A * | 9/1996 | Carnaggio et al. | 367/15 |
| 7,024,046 | B2 * | 4/2006 | Dekel et al. | 382/240 |
| 7,050,063 | B1 * | 5/2006 | Mantor et al. | 345/582 |
| 7,222,306 | B2 * | 5/2007 | Kaasila et al. | 715/801 |
| 7,420,698 | B2 * | 9/2008 | Ferlitsch | 358/1.15 |
| 7,626,569 | B2 * | 12/2009 | Lanier | 345/156 |
| 7,805,011 | B2 * | 9/2010 | Klamer et al. | 382/232 |
| 7,924,172 | B1 * | 4/2011 | Swearingen et al. | 340/972 |
| 8,059,858 | B2 * | 11/2011 | Brundage et al. | 382/100 |

OTHER PUBLICATIONS

H. Chang et al., "Super-resolution Through Neighbor Embedding", Proceedings of the 2004 IEEE Computer Society Conference on Computer vision and Pattern Recognition (CVPR 2004), vol. 1, pp. 275-282, Washington, D.C., Jun. 27-Jul. 2, 2004.
Rob Fergus, et al., "Removing Camera Shake From a Single Photograph", ACM Trans. on Graphics, vol. 25, issue 3, pp. 787-794, (Proc. SIGGRAPH 2006).

* cited by examiner

*Primary Examiner* — Yosef Kassa
(74) *Attorney, Agent, or Firm* — Weaver Austin Villeneuve & Sampson, LLP (57) ABSTRACT

Disclosed are methods and apparatus for improving images. At an image management system for storing a plurality of images from a plurality of users via a computer network, a new image is received and stored. So as to generate a new improved image, each patch of the new image is changed into an improved image patch based on selecting one or more selected mappings for converting one or more low-quality patches into one or more high-quality patches. The one or more selected mappings are determined from the images stored by the image management system. The new improved image is provided to the user.

22 Claims, 5 Drawing Sheets

AUTOMATIC SUPER-RESOLUTION TRANSFORMATION FOR IMAGES

BACKGROUND OF THE INVENTION

The present invention is related to management of images and the like. Additionally, it relates to management of photographs obtained from cameras having low image quality, such as camera phones.

The diversity of cameras has rapidly increased. One rapidly expanding camera market is the camera phone. Although convenient, camera phones are typically associated with poor quality images. For instance, the images tend to be blurry, e.g., due to no flash, low-resolution, and/or motion.

Accordingly, improved mechanisms for increasing image quality would be beneficial.

SUMMARY OF THE INVENTION

Apparatus and methods for improving image quality are disclosed. In a specific embodiment, a computer implemented method of improving images is provided. At an image management system for storing a plurality of images from a plurality of users via a computer network, a new image is received and stored. So as to generate a new improved image, each patch of the new image is changed into a new improved image patch based on selecting one or more selected mappings for converting one or more low-quality patches into one or more high-quality patches. The one or more selected mappings are determined from the images stored by the image management system. The new improved image is provided to the user.

In on embodiment, the new image is obtained from a camera phone. In another embodiment, the new image is improved if a camera identification that is received with the new image is determined to have a low-quality based on whether the received camera identification corresponds to a camera that has been predetermined to produce low-quality images. In a specific implementation, the new improved image is only provided to the user if the new improved image has a predefined acceptable quality and if authorized by the user.

In another implementation, improving the new image comprises deblurring the new image if it is determined to have a low resolution, and the method further includes (i) at the image management system, receiving a plurality of high-resolution images before the new image is received, (ii) artificially deblurring each of the received high-resolution images into a plurality of corresponding low-resolution images, (iii) dividing the high and low-resolution image pairs into a plurality of high image patches and a plurality of low image patches, and (iv) by utilizing a learning technique, obtaining a mapping for converting each low-resolution patch into its corresponding high-resolution patch to obtain a plurality of mappings, from which the one or more selected mappings are obtained. In a further aspect, the new image is only deblurred if the new image has less than a predetermined minimum number of sharp edges or if more than a predetermined number of pixels look similar to its neighbor pixels. In another aspect, a geographical location associated with the new image is also received. The low-resolution images are filtered based on whether the geographical location associated with the new image matches or has a same range as a geographical location associated with each of the low-resolution images. The one or more selected mappings are obtained from the filtered low-resolution images.

In yet another specific implementation, improving each patch of the new image into a new improved image patch is based on a predetermined mapping that is obtained by (i) determining a weight value for each of a plurality of feature vectors from a plurality of low-quality image patches so that a linear combination of the weighted feature vectors results in the patch of the new image, and (ii) applying the determined weights to each of a plurality of mappings corresponding to the low-quality image patches in a linear combination to obtain the predetermined mapping.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

A low-quality image is typically missing information that was in the original scene. For example, this effect can be caused by a lens that is too small, and thus limits the optical resolution of the image, or a sensor that has too few pixels, and thus limits number of samples. From a strictly information-theory point of view about the camera, the information has been lost. However, if the image is a specific building that is known, a lot about what the final image should look like can also be known. For instance, the edges of windows can be assumed to be straight and sharp. Given a large set of sufficiently high-resolution or high-quality images, other subtle features can be known, such as the texture of the marble. Certain embodiments of this invention include techniques for learning mappings between high-quality and low-quality images obtained from an image storage system, and then applying selected mapping(s) to new low-resolution image received into an image storage system.

In general, apparatus and methods for providing super-resolution transformation to enhance the visual appearance of blurred images are provided. For example, low-resolution images are obtained from a device having a geographical location mechanism, e.g., from a camera phone with GPS (global position satellite) feature. When images are stored by a high number of users with an on-line photo storage service (e.g., Flickr available from Yahoo!, Inc. of Sunnyvale, Calif.), subsets of these stored images are likely to be similar, or even identical. For example, some images will have been taken at a same geographical location or area and perspective and/or a same timeframe. Regardless of location or timeframe, the stored images may include any number of similar images or image "patches." As a result of this commonality, deblurring techniques can be implemented quite effectively on blurred images by using one or more similar images that were taken with a better camera (e.g., not blurred). In other words, one or more shared image databases can be used to deblur an image.

Although embodiments of the present invention are described below with respect to images that are captured on a camera phone having geographical location capabilities, the techniques and apparatus of the present invention may also be applied to other types of devices that result in blurred images. By way of examples, blurry images may be produced by digital personal assistants (PDA's) with a camera and with or without geographical location capability, inexpensive cameras with or without geographical location capability, etc. Additionally, although the following techniques are described with respect to using similar image patches or portions, similar "whole" images may alternatively be used.

Although the following techniques are described as being applied to blurry types of low-resolution images, these techniques can be applied to improve any type of low-resolution or low-quality image. There are many ways that an image could be degraded and, thus, have low resolution or low quality. A camera might have a tiny lens (thus causing the image to be optically limited), or the sensor might be too small (causing details to be thrown away), or the sensor might not have enough light (causing the sensor's signal to be dominated by photon noise), or the exposure setting of the camera could be wrong (so important details of the image are washed out). All of these degradations represent transformations that can be learned and, thus, compensated for with the right mapping. In another deblurring example, the following techniques can be altered to produce artificially motion-blurred images from a training set of unblurred images, and these unblurred images can then be used in the same way as the artificially generated low-resolution images described herein.

Figure 1:
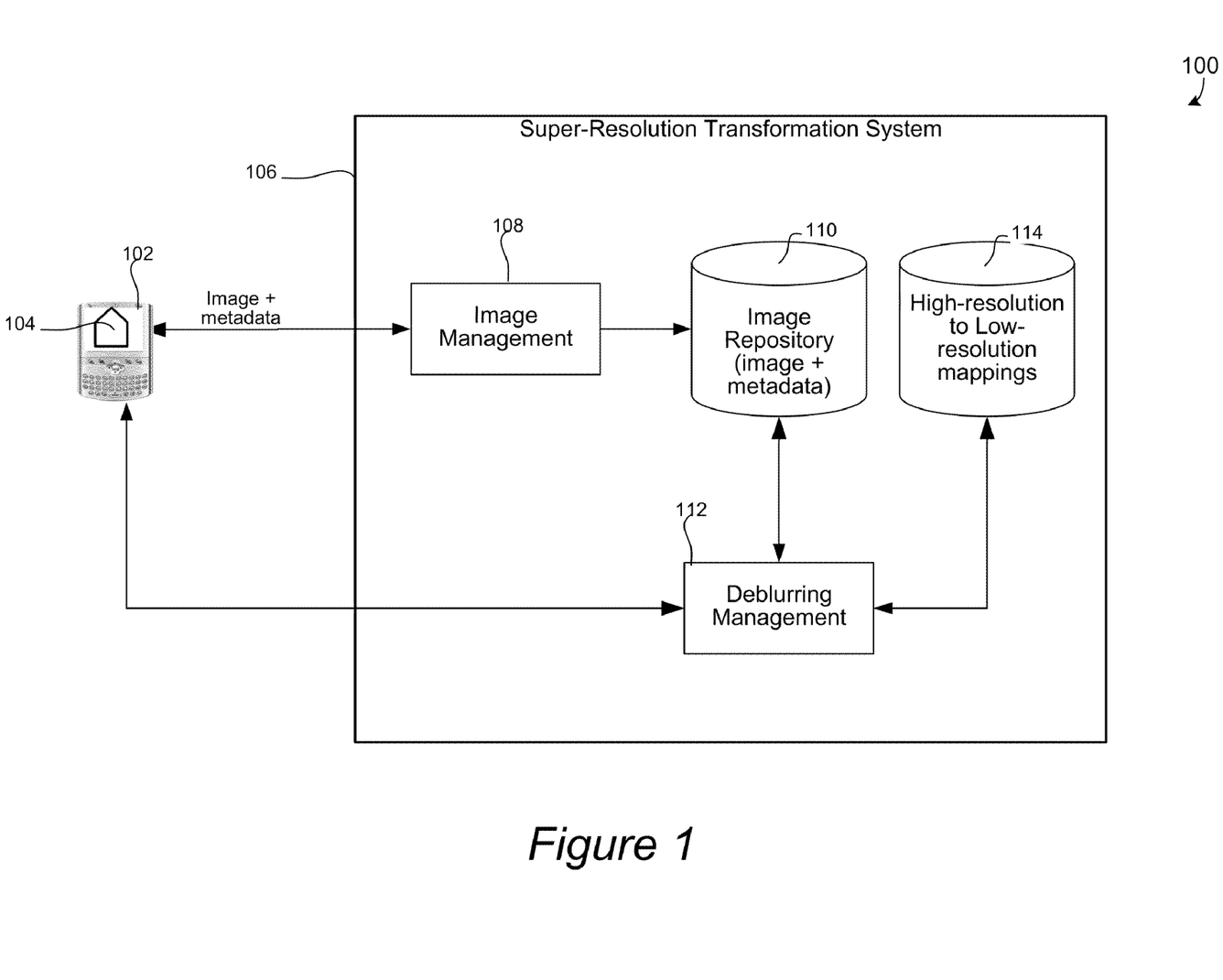
FIG. 1 illustrates a super-resolution transformation system in accordance with one embodiment of the present invention.

FIG. 1 illustrates a super-resolution transformation system 100 in accordance with one embodiment of the present invention. The individual modules and databases of this super-resolution transformation system 100 may be implemented separately or together with respect to any number of servers. As shown, the super-resolution transformation system 100 may include an image management system 106 for users to store their captured images in a shared and networked environment. The image management system 106 may also provide image editing and organization options. The image management system 106 may also have access to one more image repositories or databases 110 for storing the received image and metadata, such as geographical information, user and device identification, time stamps, etc.

Images are typically obtained from image capturing devices, e.g., camera phone 102, a personal digital assistant (PDA), camera, etc., and the images are then received into the image management system 106. For example, images may be uploaded to image management system 106 by users directly from image capturing devices or uploaded via intermediary computer systems. In one example, a user logs into the image management system 106, using his camera phone 102, and the user is then provided with a user interface for uploading images that were recently captured with the camera phone. In another example, the user syncs his camera phone with an intermediary computer system to which his captured images are uploaded. The user then accesses the image management system 106, using his intermediary computer system, so as to upload the captured images.

The uploaded image may be associated with any suitable type of metadata. Examples of metadata include geographical information, tags, time stamps, user identification information, image capturing device information, etc. The metadata may be provided by various mechanisms, such as automatically by the image capturing device or intermediary computer or by the user inputting such metadata with the uploaded image (before or after such image is uploaded to the image management system 106).

The super-resolution transformation system 100 may also include a deblurring management module 112 for automatically deblurring received images by using high-quality (e.g., unblurry or high-resolution) images that have already been obtained from a plurality of users. In general, the deblurring management module 112 determines and uses mappings for converting low-resolution image patches into high-resolution image patches, e.g., from database 114, to deblur image patches. The deblurred images can be automatically provided to the users (with permission) and stored in one or more databases, e.g., image repository 110.

Figure 2:
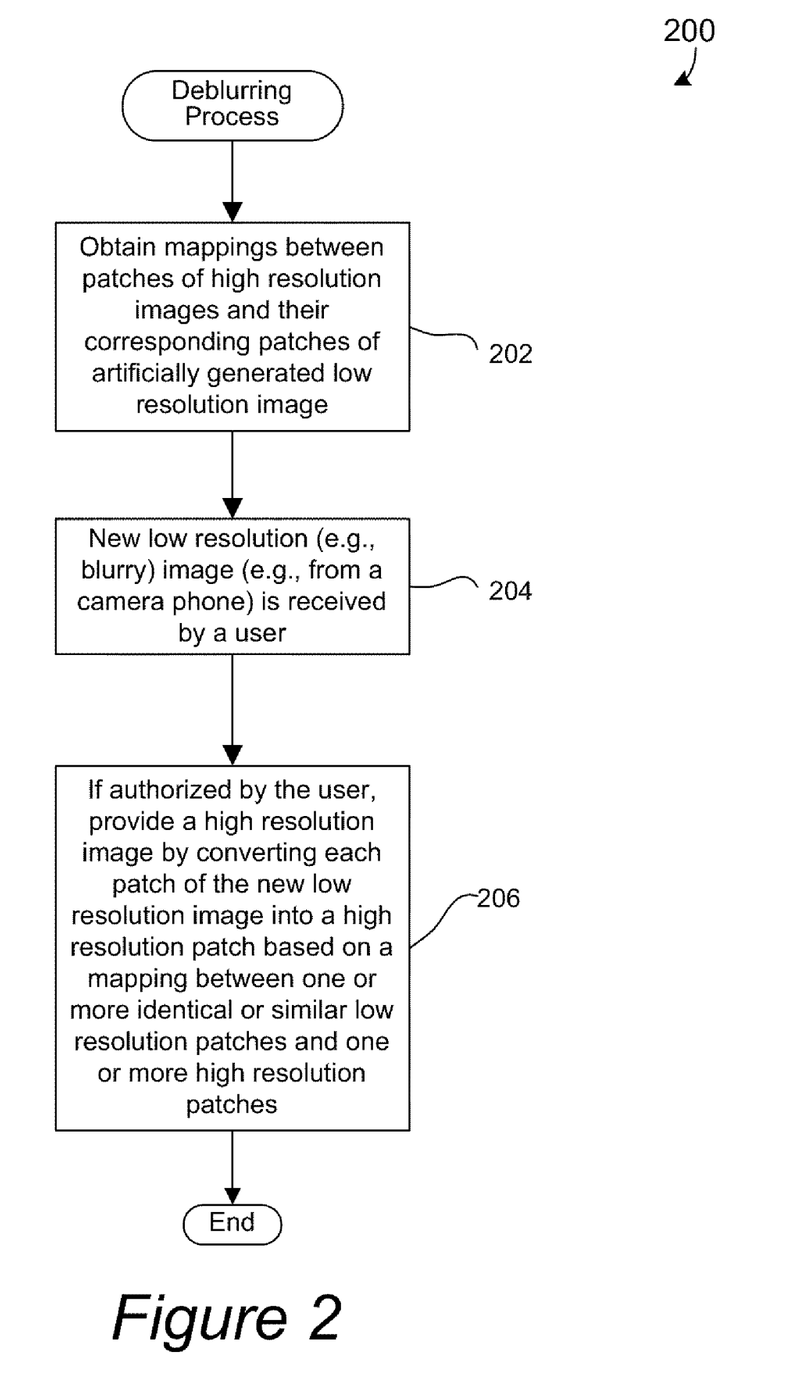
FIG. 2 is a flow chart illustrating a process for deblurring images in accordance with one embodiment of the present invention.

FIG. 2 is a flow chart illustrating a process for deblurring images in accordance with one embodiment of the present invention. Initially, mappings between patches of high-resolution images and their corresponding patches of artificially generated low-resolution images are obtained in operation 202. In general, these mappings are obtained using a learning technique based on a set of training images that are not blurred (or high-resolution) as further described herein.

A new low-resolution (e.g., blurry) image may then be received by a user in operation 204. For example, a user uploads an image that was captured with her camera phone to an image storage system that has access to shared images (e.g., image management system 106).

If authorized by a user, a high-resolution image may be provided to the user by converting each patch of the new low-resolution image into a high-resolution patch based on a mapping between one or more identical or similar low-resolution patches and one or more corresponding high-resolution patches in operation 206. An example high-resolution generation technique that utilizes one or more identical or similar image patches (obtained from a training set) is described in the article "Super-resolution Through Neighbor Embedding", Chang, H. and Yeung, D. Y. and Xiong, Y., Proceedings of the 2004 IEEE Computer Society Conference on Computer Vision and Pattern Recognition (CVPR 2004), vol. 1, pp. 275-282, Washington, D.C., USA, 27 Jun.-2 Jul. 2004, which publication is herein incorporated by reference in its entirety.

In the illustrated embodiment, a user may optionally select to have a deblurring feature implemented for all or a portion of his uploaded images. For instance, a user may set up preferences (e.g., via pull down menus or radio buttons) within a user profile of a registered account (e.g., with the image management system 106). Alternatively, deblurring may be performed automatically on all uploaded images. However, this last option is not recommended since some users may purposely blur their photos and not wish to have them deblurred.

Figure 3:
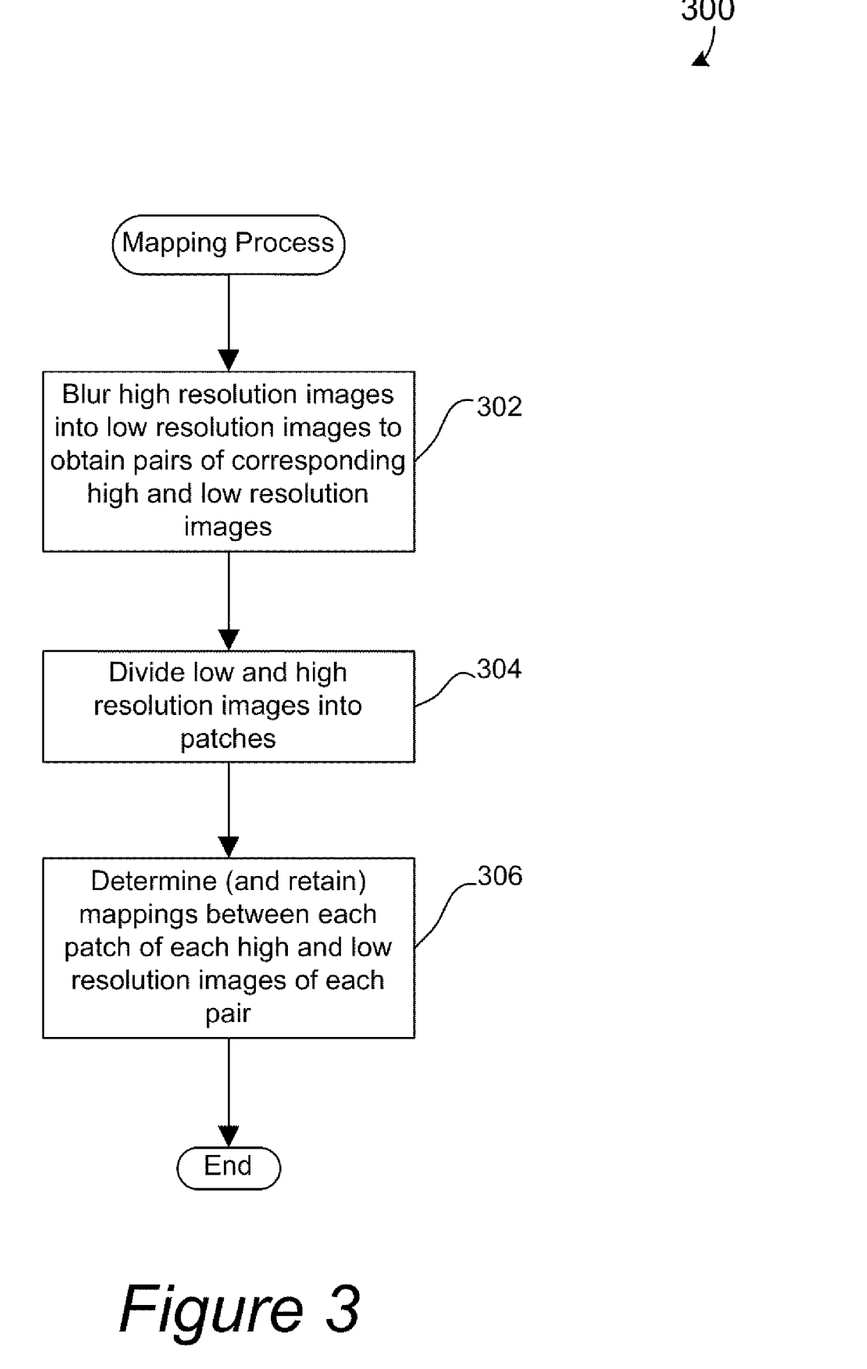
FIG. 3 is a flow chart illustrating a mapping process in accordance with a specific implementation of the present invention.

FIG. 3 is a flow chart illustrating a mapping process in accordance with a specific implementation of the present invention. Initially, high-resolution images (e.g., stored by image management system 106) may be artificially blurred into low-resolution images to obtain pairs of corresponding high and low-resolution images in operation 302. Thus, a blurred image and an unblurred version of the same image are obtained.

The high-resolution images may be obtained from one or more shared image database(s). The high-resolution images are obtained with cameras having a significantly higher resolution than cameras that capture images that are defined as blurry. High-resolution and low-resolution may be defined in any suitable manner. For example, high-resolution can be defined as higher than about 2000 pixels across an image while low-resolution can be defined as lower than about 1000 pixels across an image. However, these definitions will likely change over time as photography or imaging technology advances.

The low and high-resolution images may then be divided into patches in operation 304. Mappings between each patch of each high and low-resolution image pair is then determined and retained in operation 306. Mappings between high and low patches may be obtained using any suitable learning technique. For example, a regression algorithm may be learned using the training set of high-resolution images as described in the above referenced publication by Chang, H. et al. That is, a specific regression algorithm for converting the low-resolution images back into their corresponding high-resolution images is obtained by adjusting the mapping until the best high-resolution images are achieved.

Figure 4:
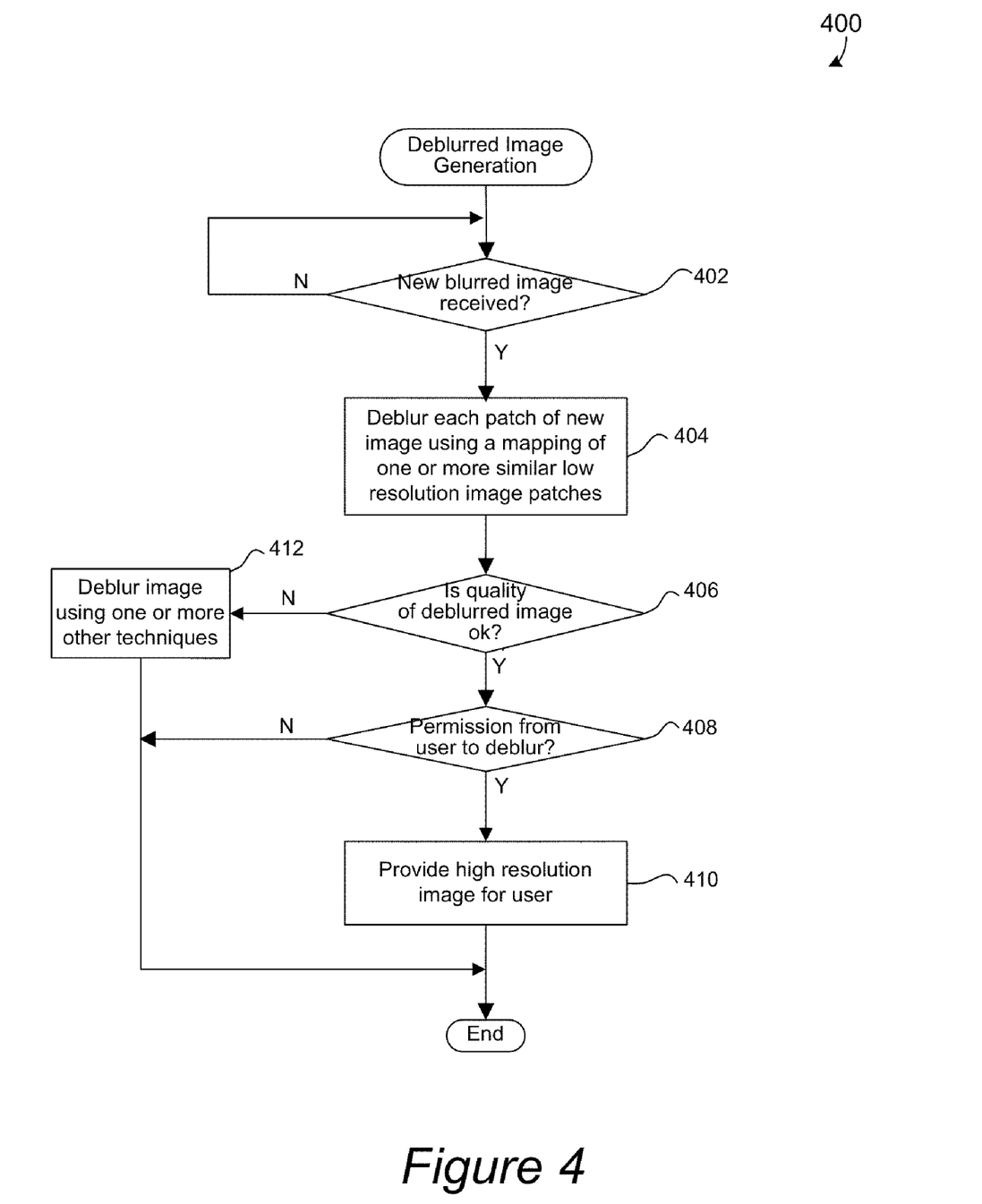
FIG. 4 is a flow chart illustrating a process for generating deblurred images in accordance with one embodiment of the present invention.

FIG. 4 is a flow chart illustrating a process for generating deblurred images in accordance with one embodiment of the present invention. Initially, it may be determined whether a new blurred image has been received in operation 402. For instance, it may determined whether a received image is blurry or has a low-resolution. A received image may be analyzed to determine whether there are substantially no sharp edges, less than a predetermined minimum number of sharp edges, or whether more than a predetermined number of pixels look similar to its neighbor pixels. In other words, blurry images will tend to have more gradual changes from pixel to pixel, than nonblurry images. In an alternative embodiment, it may be learned which camera phones (or camera) are likely to produce blurry images and which are more likely to produce nonblurry images. When a new image is received from a known blurry device, such new image may be determined to be blurry based on the camera identification that is also received as metadata without further analysis. Likewise, images from known nonblurry devices are presumed to be nonblurry without further analysis. In yet an alternative embodiment, blurry images may be identified by the user.

If no new blurred image is received, the process 400 may continue to wait. Otherwise, if a new blurred image is received, each patch of the new image is deblurred using a mapping of one or more similar low-resolution image patches in operation 404. Before performing this operation, the user may be asked for permission to deblur the image. However, since the deblurred image may not be acceptable, it may be preferable to proceed with the deblurring without asking the user yet at this point, only querying the user if an acceptable deblurred image is achieved.

As a first step in the deblurring process, all the low-resolution images (with corresponding mappings) may be filtered based on whether their geographical location matches the geographical location of the received new blurred image. For instance, the GPS coordinates, which are part of the metadata, for the received image match one or more low-resolution images (or are within a same range of one or more low-resolution images). These filtered low-resolution images may be further filtered based on time or date stamp, which also may be contained in the metadata of the received new image. For example, images that were taken within about the same timeframe (e.g., day vs. night or winter vs. summer) would be more similar, than images taken at significantly different times. The filtered low-resolution images at the same geographical location (and possible same time or within the same timeframe) as the received new blurred image may then be analyzed to find single identical or one or more similar image patches. For example, the one or more similar image patches and their corresponding mappings may be found based on how closely each mapping's low-resolution patch (e.g., feature vector or number of pixels) matches the particular low-resolution image patch of the new image. In one technique, a nearest neighbor search is performed in a filtered feature vector space.

Alternatively, the geographical location and/or timestamp can be ignored and one more similar low-resolution images may be found without first filtering them. For instance, image patches of a person's face tend to be very similar. Accordingly, there may be many similar or identical image patches from multiple people's faces.

Regardless, a mapping for the one or more similar low-resolution image patches may then be applied to each patch of the received blurred image. There may be cases in which an identical image has been found. For example, there may be 1000's of identical Golden Gate photographs from the same exact location and perspective. One of these identical images could be used to map each patch to a high-resolution patch. In the instance in which there is not an identical image or patch, a plurality of similar patches may be found for a particular new patch. In this case, a weight value may be applied to each of the similar image patch vectors and the weighted vectors may be used in a linear combination (e.g., weighted average) so as to result in the particular new image patch. The corresponding mappings may then be similarly weighted and combined to obtain a new mapping that is applied to the particular new image patch so as to obtain a high-resolution image patch. In alternative mapping techniques, the weighting may be based on any suitable one or more factors, such a geographic distance and capture time.

It may then be determined whether the quality of the deblurred image is acceptable in operation 406. For instance, it may be determined if the image has a predefined minimum number of locally similar pixels.

If the quality of the deblurred image is acceptable, it may then be determined whether permission has been received from a user to deblur the low-resolution image in operation 408. If permission is received, the high-resolution image may then be provided for the user in operation 410. The user may wish to not be provided with a deblurred image for any number of reasons (e.g., the user has purposely taken artistically blurred photos). Accordingly, if permission is not received or the quality of the deblurred image is not acceptable, the process 400 may end.

Optionally, one or more other deblurring techniques may be applied in operation 412 if the patch deblurring technique is deemed unacceptable. One alternative deblurring technique is described in the publication "Removing Camera Shake from a Single Photograph", Ron Fergus et al., 2006, which publication is incorporated herein by reference in its entirety. Other deblurring techniques as described herein may also be utilized.

Any suitable learning system may be utilized to determine the mappings for obtaining the high-resolution image patches from the artificially generated low-resolution image patches or learning which camera are likely to be blurry. Examples of suitable learning techniques include Support Vector Machines (e.g., LIBSVM), neural networks, collaborative filtering techniques, Decision Tree (e.g., TreeNet), latent semantic indexing, probabilistic latent semantic analysis, logistic regression, etc. In general, information retrieval techniques based on matrix factorization methods, logistic regression, and/or neural networks can be used. A suitable open source learning Support Vector Machine algorithm is also available through Kernel-Machines.org. Embodiments of the Support Vector Machine are further described in (i) the publication by Ron Meir, "Support Vector Machines—an Introduction", Dept. of Electr. Eng. Technion, Israel, June 2002, (ii) U.S. Pat. No. 7,356,187, issued 8 Apr. 2008 by Shananhan et al., and (iii) U.S. Pat. No. 6,816,847, issued 9 Nov. 2004 by Toyama. These documents and patents are incorporated herein by reference in their entirety.

Figure 5:
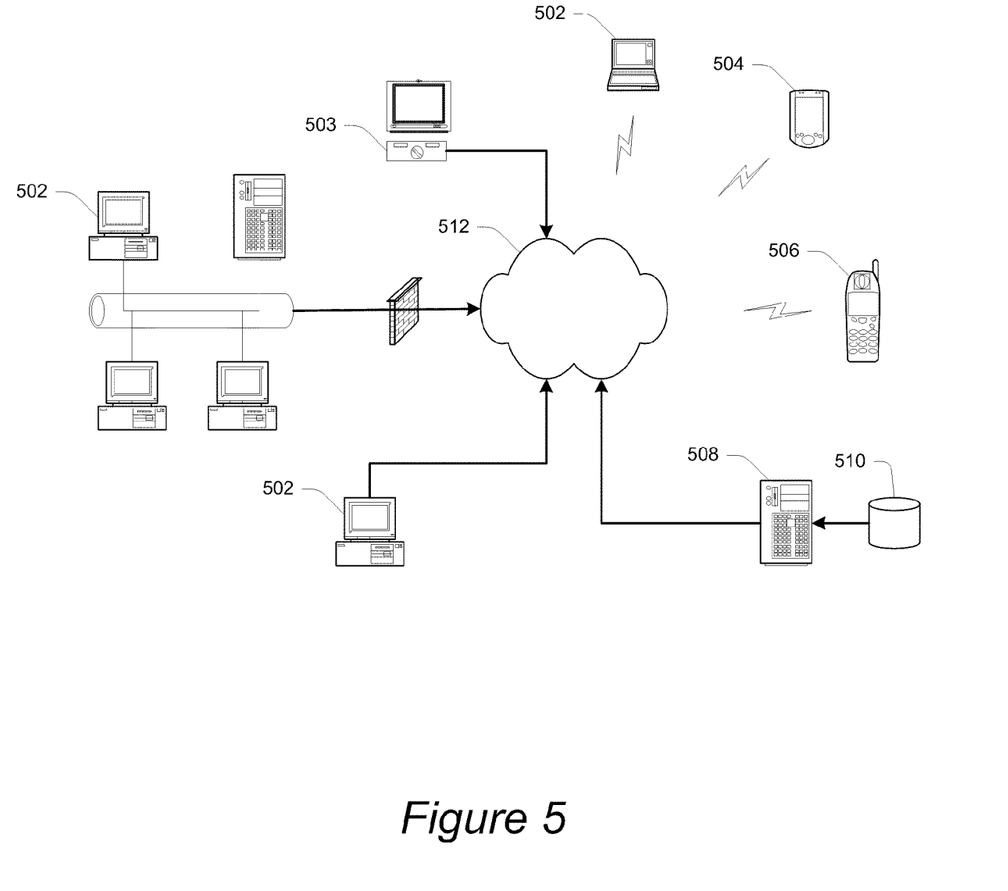
FIG. 5 is a simplified diagram of a network environment in which specific embodiments of the present invention may be implemented.

Embodiments for generating high-resolution (or deblurred) images may be employed in a wide variety of diverse computing contexts. For example, as illustrated in FIG. 5, implementations are contemplated in which the relevant population of users interact with a diverse network environment via any type of computer (e.g., desktop, laptop, tablet, etc.) 502, media computing platforms 503 (e.g., cable and satellite set top boxes and digital video recorders), handheld computing devices (e.g., PDAs) 504, cell phones (camera phones with GPS) 406, or any other type of computing or communication platform.

And according to various embodiments, images that are processed in accordance with the invention may be obtained using a wide variety of techniques. For example, a user's interaction with a local application, web site or web-based application or service (e.g., using a mobile device's camera) may be accomplished using any of a variety of well known mechanisms for managing images. However, it should be understood that such methods of obtaining images are merely exemplary and that images (or video) may be collected in many other ways.

High-resolution generation may be handled according to the invention in some centralized manner. This is represented in FIG. 5 by server 508 and data store 510 that, as will be understood, may correspond to multiple distributed devices and data stores. Embodiments of the present invention may also be practiced in a wide variety of network environments (represented by network 104) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Systems for providing generating or providing high resolution images may be implemented on one or more computer systems. For instance, a computer system may include any number of processors (also referred to as central processing units, or CPUs) that are coupled to storage devices including primary storage (typically a random access memory, or RAM), primary storage (typically a read only memory, or ROM). The CPU may be of various types including microcontrollers and microprocessors such as programmable devices (e.g., CPLDs and FPGAs) and unprogrammable devices such as gate array ASICs or general-purpose microprocessors. As is well known in the art, primary storage can act to transfer data and instructions uni-directionally to the CPU and primary storage can be used typically to transfer data and instructions in a bi-directional manner. Both of these primary storage devices may include any suitable computer-readable media such as those described herein. A mass storage device may be also coupled bi-directionally to a CPU and provides additional data storage capacity and may include any of the computer-readable media described herein. A mass storage device may be used to store programs, data and the like and is typically a secondary storage medium such as a hard disk. It will be appreciated that the information retained within a mass storage device, may, in appropriate cases, be incorporated in standard fashion as part of primary storage as virtual memory. A specific mass storage device such as a CD-ROM may also pass data uni-directionally to the CPU.

Each CPU can also be coupled to an interface that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, each CPU optionally may be coupled to an external device such as a database or a computer or telecommunications network using an external connection. With such an external connection, it is contemplated that a CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store high-resolution (or unblurred) and low-resolution (or blurry), mappings, metadata, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A computer implemented method of improving images, comprising:
    at an image management system for storing a plurality of images from a plurality of users via a computer network, receiving and storing a new image;
    to generate a new improved image, changing each of a plurality of patches from the new image into an improved image patch based on selecting one or more selected mappings for converting one or more low-quality patches into one or more high-quality patches, wherein the one or more selected mappings for converting the one or more low-quality patches to the one or more high-quality patches included in the new improved image are determined from others of the images stored by the image management system; and
    providing the new improved image to the user.

2. The method as recited in claim 1, wherein the new improved image is only provided to the user if the new improved image has a predefined acceptable quality and if authorized by the user.

3. The method as recited in claim 1, wherein improving the new image comprises deblurring the new image if it is determined to have a low resolution, the method further comprising:
    at the image management system, receiving a plurality of high-resolution images before the new image is received;
    artificially deblurring each of the received high-resolution images into a plurality of corresponding low-resolution images;
    dividing the high and low-resolution image pairs into a plurality of high image patches and a plurality of low image patches; and
    by utilizing a learning technique, obtaining a mapping for converting each low-resolution patch into its corresponding high-resolution patch to obtain a plurality of mappings, from which the one or more selected mappings are obtained.

4. The method as recited in claim 1, wherein the new image is obtained from a camera phone.

5. The method as recited in claim 3, wherein the new image is only deblurred if the new image has less than a predetermined minimum number of sharp edges or if more than a predetermined number of pixels look similar to its neighbor pixels.

6. The method as recited in claim 1, wherein the new image is improved if a camera identification that is received with the new image is determined to have a low-quality based on whether the received camera identification corresponds to a camera that has been predetermined to produce low-quality images.

7. The method as recited in claim 3, further comprising:
    receiving a geographical location associated with the new image;
    filtering the low-resolution images based on whether the geographical location associated with the new image matches or has a same range as a geographical location associated with each of the low-resolution images; and
    obtaining the one or more selected mappings from the filtered low-resolution images.

8. The method as recited in claim 1, wherein improving each patch of the new image into a new improved image patch is based on a predetermined mapping that is obtained by:
    determining a weight value for each of a plurality of feature vectors from a plurality of low-quality image patches so that a linear combination of the weighted feature vectors results in the patch of the new image; and
    applying the determined weights to each of a plurality of mappings corresponding to the low-quality image patches in a linear combination to obtain the predetermined mapping.

9. An apparatus comprising at least a processor and a memory, wherein the processor and memory are configured to perform the following operations:
    at an image management system for storing a plurality of images from a plurality of users via a computer network, receiving and storing a new image;
    to generate a new improved image, changing each of a plurality of patches from the new image into an improved image patch based on selecting one or more selected mappings for converting one or more low-quality patches into one or more high-quality patches, wherein the one or more selected mappings for converting the one or more low-quality patches to the one or more high-quality patches included in the new improved image are determined from others of the images stored by the image management system; and
    providing the new improved image to the user.

10. The apparatus as recited in claim 9, wherein the new improved image is only provided to the user if the new improved image has a predefined acceptable quality and if authorized by the user.

11. The apparatus as recited in claim 9, wherein improving the new image comprises deblurring the new image if it is determined to have a low resolution, and wherein the processor and memory are further configured for:
    at the image management system, receiving a plurality of high-resolution images before the new image is received;
    artificially deblurring each of the received high-resolution images into a plurality of corresponding low-resolution images;
    dividing the high and low-resolution image pairs into a plurality of high image patches and a plurality of low image patches; and
    by utilizing a learning technique, obtaining a mapping for converting each low-resolution patch into its corresponding high-resolution patch to obtain a plurality of mappings, from which the one or more selected mappings are obtained.

12. The apparatus as recited in claim 9, wherein the new image is obtained from a camera phone.

13. The apparatus as recited in claim 11, wherein the new image is only deblurred if the new image has less than a predetermined minimum number of sharp edges or if more than a predetermined number of pixels look similar to its neighbor pixels.

14. The apparatus as recited in claim 9, wherein the new image is improved if a camera identification that is received with the new image is determined to have a low-quality based on whether the received camera identification corresponds to a camera that has been predetermined to produce low-quality images.

15. The apparatus as recited in claim 11, wherein the processor and memory are further configured for:
- receiving a geographical location associated with the new image;
- filtering the low-resolution images based on whether the geographical location associated with the new image matches or has a same range as a geographical location associated with each of the low-resolution images; and
- obtaining the one or more selected mappings from the filtered low-resolution images.

16. At least one computer readable storage medium having computer program instructions stored thereon that are arranged to perform the following operations:
- at an image management system for storing a plurality of images from a plurality of users via a computer network, receiving and storing a new image;
- to generate a new high resolution image, improving each patch of the new image into a new improved image patch based on selecting one or more selected mappings for converting one or more low-quality patches into one or more high-quality patches, wherein the one or more selected mappings for converting the one or more low-quality patches to the one or more high-quality patches included in the new improved image are determined from others of the images stored by the image management system; and
- providing the new improved image to the user.

17. The at least one computer readable storage medium as recited in claim 16, wherein the new improved image is only provided to the user if the new improved image has a predefined acceptable quality and if authorized by the user.

18. The at least one computer readable storage medium as recited in claim 16, wherein improving the new image comprises deblurring the new image if it is determined to have a low resolution, and wherein the processor and memory are further configured for:
- at an image management system for storing a plurality of images from a plurality of users via a computer network, receiving and storing a new image;
- to generate a new improved image, changing each of a plurality of patches from the new image into an improved image patch based on selecting one or more selected mappings for converting one or more low-quality patches into one or more high-quality patches, wherein the one or more selected mappings are determined from the images stored by the image management system; and
- providing the new improved image to the user.

19. The at least one computer readable storage medium as recited in claim 16, wherein the new image is obtained from a camera phone.

20. The at least one computer readable storage medium as recited in claim 18, wherein the new image is only deblurred if the new image has less than a predetermined minimum number of sharp edges or if more than a predetermined number of pixels look similar to its neighbor pixels.

21. The at least one computer readable storage medium as recited in claim 16, wherein the new image is improved if a camera identification that is received with the new image is determined to have a low-quality based on whether the received camera identification corresponds to a camera.

22. The at least one computer readable storage medium as recited in claim 18, wherein the processor and memory are further configured for:
- receiving a geographical location associated with the new image;
- filtering the low-resolution images based on whether the geographical location associated with the new image matches or has a same range as a geographical location associated with each of the low-resolution images; and
- obtaining the one or more selected mappings from the filtered low-resolution images.

* * * * *